United States Patent [19]

Thomas

[11] 4,289,958
[45] Sep. 15, 1981

[54] SYSTEM FOR IDENTIFYING SOLID DOSAGE UNITS

[75] Inventor: Stephen Thomas, Cardiff, Wales

[73] Assignee: Edwin Burgess Limited, Aylesbury, England

[21] Appl. No.: 119,597

[22] Filed: Feb. 7, 1980

[51] Int. Cl.³ .................................... G06K 19/06
[52] U.S. Cl. .............................. 235/489; 209/552
[58] Field of Search ............. 235/489, 552; 209/580, 209/581, 582

[56] References Cited

U.S. PATENT DOCUMENTS 4,082,188 4/1978 Grimmell ........................ 209/580

Primary Examiner—Harold I. Pitts
Attorney, Agent, or Firm—Sughrue, Mion, Zinn, Macpeak and Seas

[57] ABSTRACT

A system is described for identifying solid dosage units, such as tablets or capsules, of drugs or other medicaments which may be found beside a patient or which may have been handed in at a hospital. The system comprises a sizing member having a substantially straightsided channel which tapers towards one end to define a V-shaped channel in which a dosage unit can be placed, markings being associated with the channel for indicating a dimension parameter of the unit when so placed. The system also comprises a color region having a plurality of colored areas for indicating a color parameter of the dosage unit, a shape region bearing a series of shape parameters and an information storage and retrieval system which may be in the form of a punched card system or a computer. Parameters of the dosage unit obtained from said V-shaped channel, from said color region and from said shape region, and, optionally, from other physical characteristics of the dosage unit are fed into the information storage and retrieval system to provide an identification of the unit.

9 Claims, 5 Drawing Figures

MARKINGS

TABLETS
1 PLAIN
2 SCORED
3 QUARTERED
4 MARKED ONE SIDE
5 MARKED TWO SIDES
6 ALL ONE COLOUR
7 TWO COLOURS
8 THREE COLOURS
9 SPOTTED
10 LAYERED

CAPSULES
11 SOFT
12 HARD
13 MARKED
14 UNMARKED
15 PLAIN COLOUR
16 COLOURED LONG.
17 COLOURED LAT.
18 BANDED
19 CONTAINS POWDER
20 CONTAINS GRANULES
21 CONTAINS LIQUID

SYSTEM FOR IDENTIFYING SOLID DOSAGE UNITS

BACKGROUND OF THE INVENTION

This invention relates to a system for identifying solid dosage units, such as tablets or capsules, of drugs or other medicaments.

It is often necessary to be able to identify solid dosage units, such as tablets or capsules, of drugs or other medicaments. Even though an increasing number of pharmaceutical companies is making attempts to identify its products, it is not always possible to print on capsules or impress on tablets sufficient information to enable a positive identification to be made. Furthermore, printing can become worn and impressions eroded so that markings on a dosage unit cannot always be relied upon with certainty.

A proprietary directory includes voluminous tables listing the characteristics of solid dosage units on the market. In order to identify a dosage unit from these tables, it is necessary to make some fairly accurate measurements of the diameter, length and/or thickness of the unit and to make subjective decisions as to colour, texture, etc. These measurements and decisions may be difficult if the units have become worn through abrasion or faded with age or exposure to light. In any case, since the tables list some 1500 different dosage units the positive identification of a dosage unit can be a lengthy and arduous task.

The identification of solid dosage units may be required in several situations. In one situation, a hospital or area pharmacist may require to identify dosage units which are in an unmarked container or have been handed in by a member of the public, identification being necessary to ascertain whether the dosage units contain dangerous drugs or what may be the best method of disposal. This is a nonemergency situation but, nevertheless, a time-consuming one.

Another situtation where identification of dosage units may be required is where unconsumed dosage units are found beside a patient in cases of drug-overdose, self-poisoning or attempted suicide. In these cases there is a paramount need for speedy identification of the dosage units on the spot so that life-saving measures or antidotes can be applied to the patient as soon as possible. Under these circumstances it would be desirable for the identification to be made by or under the surveillance of ambulance personnel or other persons so that, if necessary, appropriate counter-measures can be taken before the patient is moved.

It is an object of the present invention to provide a system whereby such identification can be effected.

SUMMARY OF THE INVENTION

According to the present invention there is provided an identification system for a solid dosage unit, comprising a member defining a substantially straight-sided channel which tapers from one end towards the other to define a V-shaped channel in which a dosage unit can be placed, markings being associated with the channel for indicating a dimension parameter of the unit when placed in the channel, a colour region having a plurality of coloured areas for indicating a colour parameter of the dosage unit, a shape region bearing a series of shape parameters, and an information storage and retrieval system operative, when fed with parameters of the dosage unit obtained from said V-shaped channel, from said colour region and from said shape region, and, optionally, with other physical parameters of said dosage unit, to provide an identification of the unit.

The system is conveniently designed so that an exact match of parameters is not required, the nearest parameter being sufficient, so that account can be taken of abrasion, fading and the slight variations in dimensions which may occur in production.

It is surprising that, in spite of the number of different types of dosage units available, a positive identification can be made in a very short time using the present system. Indeed in one demonstration it was possible on the basis of five or six parameters to make a positive identification in about 30 seconds of a particular dosage unit from 150 dosage units including some very similar in appearance to the particular one identified.

Part of the success of the present system is believed to reside in the V-shaped channel member or sizing-V. This can be in the form of a solid member one face of which is formed with a groove which is V-shaped in plan view or two parallel sided walls mounted on a base so as to converge towards a point to form a V-shaped channel. Lines are marked across the V, normal to the bisector of the angle of the V and equidistant from each other. These lines are numbered but the numbering and spacing of the lines will be related to the angle of the V and to the information to be held in the storage system. At the present moment, we prefer an apex angle for the V of about 6°15', a numbering of 0 to 35 and a line spacing of 5 mm. but these values are not to be regarded as limiting in any way.

In order to use the sizing-V, it is held with the apex pointing downwards and the dosage unit is placed in the channel firstly edge-on and allowed to descend as far down the V as it will go. The number of the line next below the lower edge of the dosage unit is noted and provides a parameter related to the thickness of the unit and referred to herein as the "edge-on V number".The unit is then taken out of the V and replaced in the channel so as to be seen in plan view. Again the unit is allowed to descend as far down the V as it will go and the number of the line next below the lower side of the unit is noted to provide a parameter related to the diameter or a length dimension of the unit and referred to herein as the "plan V number".

Other parameters for identifying a dosage unit are obtained from the colour card which is provided with a number of different colour samples each of which is numbered. The dosage unit is compared with the colour samples and the number of the sample which is the nearest approximation to the colour of the unit is noted as "the colour number". Likewise the card bearing a series of shape parameters shows a series of numbered edge-on views and a series of plan views of various possible shapes, each view being numbered. For example, the plan view may include a circle, a triangle, a rhombus, a pentagon, a hexagon, and other polygons with sharp or rounded corners, and various ellipses. The dosage unit is viewed edge-on and the edge-on shape view on the card nearest to that of the unit is noted to provide a further parameter referred to herein as "the edge-on shape number". Likewise another parameter for the plan view is also obtained and referred to as "the plan shape number".

Other physical parameters of the dosage unit may be noted which do not require measurement, but which can nevertheless be fed to the storage system to aid in identification. Thus, for example, an indication as to whether the dosage unit is a tablet or capsule can be a first identification step which can reduce the number of items to be considered under the remaining parameters by the storage and retrieval system. Likewise information as to whether the dosage unit is glossy or not may be useful.

Finally, markings on the dosage unit, insofar as they do not provide immediate and positive identification may be considered. However, such markings should be regarded as confirmatory and will preferably not be taken into consideration until a positive identification has been effected using the other parameters.

The various parameter numbers serving to identify the dosage unit are then fed to the information storage and retrieval system, where, by a process of selection or elimination, information giving a positive identification of the dosage unit is provided. If by any chance the storage and retrieval system relates the parameters fed into it to more than one type of dosage unit, either due to great similarity between the two types (which is a possibility) or due to some other reason connected with the reading of the parameters (e.g. due to abrasion or fading), markings on the dosage unit can provide a final check or a simple physical or chemical test or spectroscopic analysis may serve to decide which dosage unit is correct.

The information storage and retrieval system may take many forms, one convenient form being a punched card system. In such a punched card system a plurality of edge-punched cards is, for example, stacked edge-on in a storage container. Each card carries details of respective dosage unit, including name, ingredients, indications, overdose symptoms, overdose treatment, analytical data, etc. Each card is punched around its edge with holes each of which is associated with a parameter relevant to a dosage unit to be identified. Appropriate holes are cut through to the edge of the card and the arrangement may be such that when a selector pin is passed through an appropriate aperture of each card, for example, the aperture corresponding to the colour number 14, all cards other than those relating to dosage units of colour number 14 are removed. The process is repeated for each parameter in turn until the last remaining card identifies the dosage unit. Variations of this selection process are possible in accordance with conventional manipulations of punched cards.

If desired, the punched card information storage and retrieval system may be operated in conjunction with a computer, but it may be desirable to use a computer for the whole information storage and retrieval system, with appropriate memory units for each dosage unit and a selection mechanism programmable by punching into it the appropriate parameter numbers to give a final read-out of the desired information relating to the selected dosage unit in one or several places. It will be appreciated that conventional computer systems can be adapted in accordance with the requirements of the present invention and they will therefore not be described in further detail. For local area or hospital identification systems, a punched card information storage and retrieval system is probably cheaper, but a computerised system could be cheaper for a national system.

In order for the present identification system to produce optimum results, it is designed for the parameters appropriate to a dosage unit to be fed to the information storage and retrieval system according to an agreed protocol and for the person or personnel operating the identification system to be trained and experienced in using the system. The protocol is so designed that, for example, an ambulance man at the site of an incident and in possession of a dosage unit can telephone an area pharmacist at a hospital and in charge of the information storage and retrieval system and, by answering a series of questions in accordance with the protocol can enable the pharmacist to identify the dosage unit and provide information on appropriate counter-measures.

As just indicated, it is an advantage of the present identification system that the dosage unit to be identified does not have to be in the same place as the information system. All that is necessary is that the person in possession of the dosage unit to be identified must be in possession of the sizing-V, the colour card and shape card. These three items are conveniently combined as one unit which may be, for example, about the size of a cheque book, so that it can be conveniently carried in the pocket, and provided with a protective cover or in a protective wallet. Thus, the unit may have the form of a front plate formed with two upstanding, parallel-sided ribs directed towards each other at one end to define a V-shaped channel, and a back plate. A card is printed on one side with a series of lines and numbers to give the V number parameters, and with a number of edge-on view and plan views of different dosage units, each view also having an appropriate number allocated to it. The back of the card carries colour samples, also numbered, and the card is sandwiched between the two plates, which may be manufactured by an appropriate process in optically clear plastics, and accurately located in relation to the V-shaped channel. The two plates are secured together by a snap-action, adhesive bonding or welding to provide a convenient unit.

BRIEF DESCRIPTION OF THE DRAWINGS

In order to enable the invention to be more readily understood, reference will now be made to the accompanying drawings, which illustrate diagrammatically and by way of example an embodiment thereof, and in which:-

FIG. 2 is a back plan view of the unit shown in FIG. 1;

FIGS. 4a and 4b are views of a punched card.

DESCRIPTION OF THE PREFERRED EMBODIMENT

Figure 1:
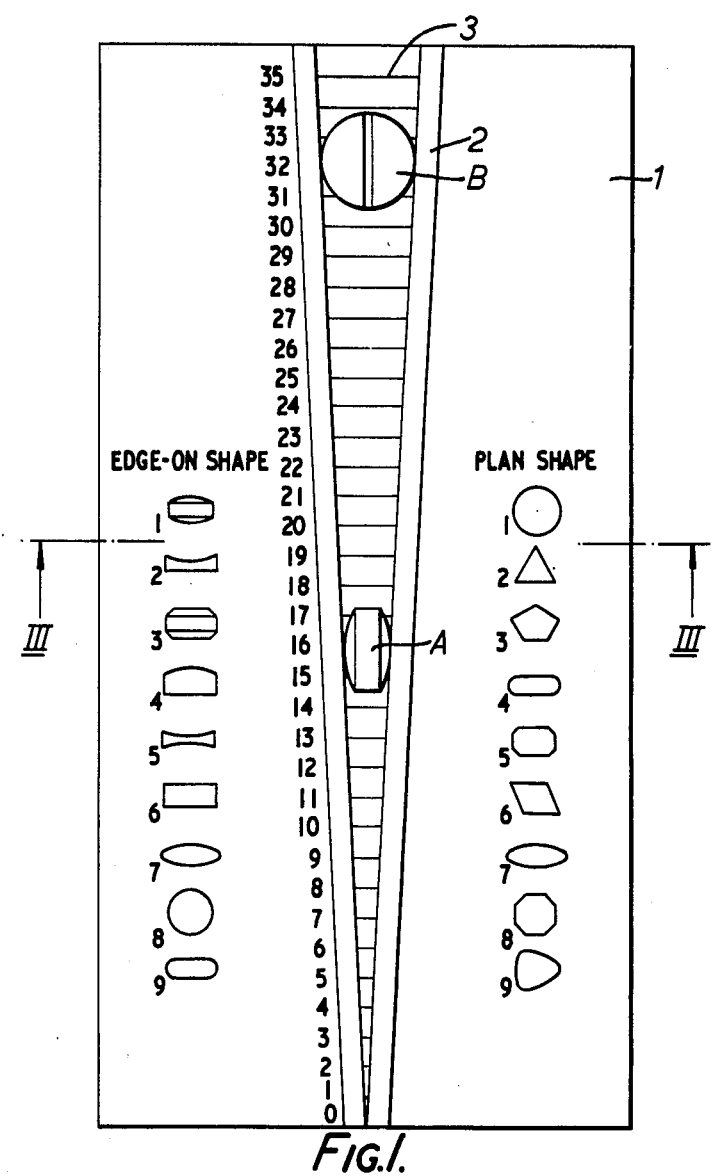
FIG. 1 is a front plan view of a combined sizing and parameter generating unit.
Figure 3:
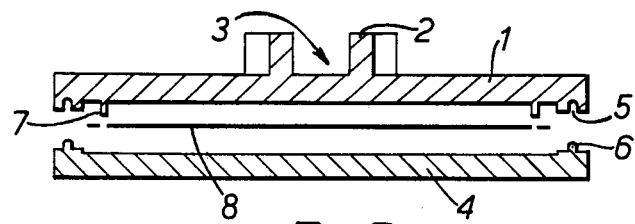
FIG. 3 is an exploded cross-section through the unit of FIGS. 1 and 2 along the line III—III in FIG. 1.
Figure 4A:
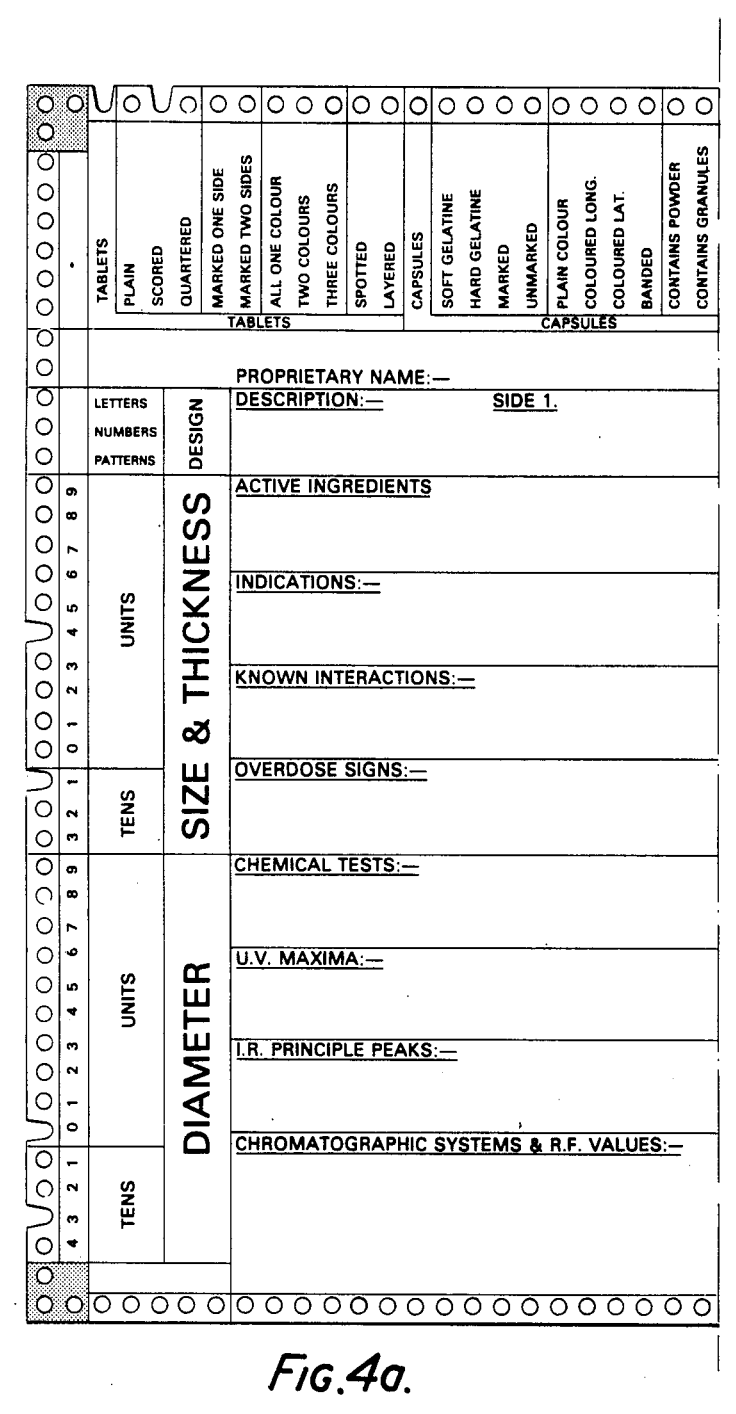
Figure 4B:
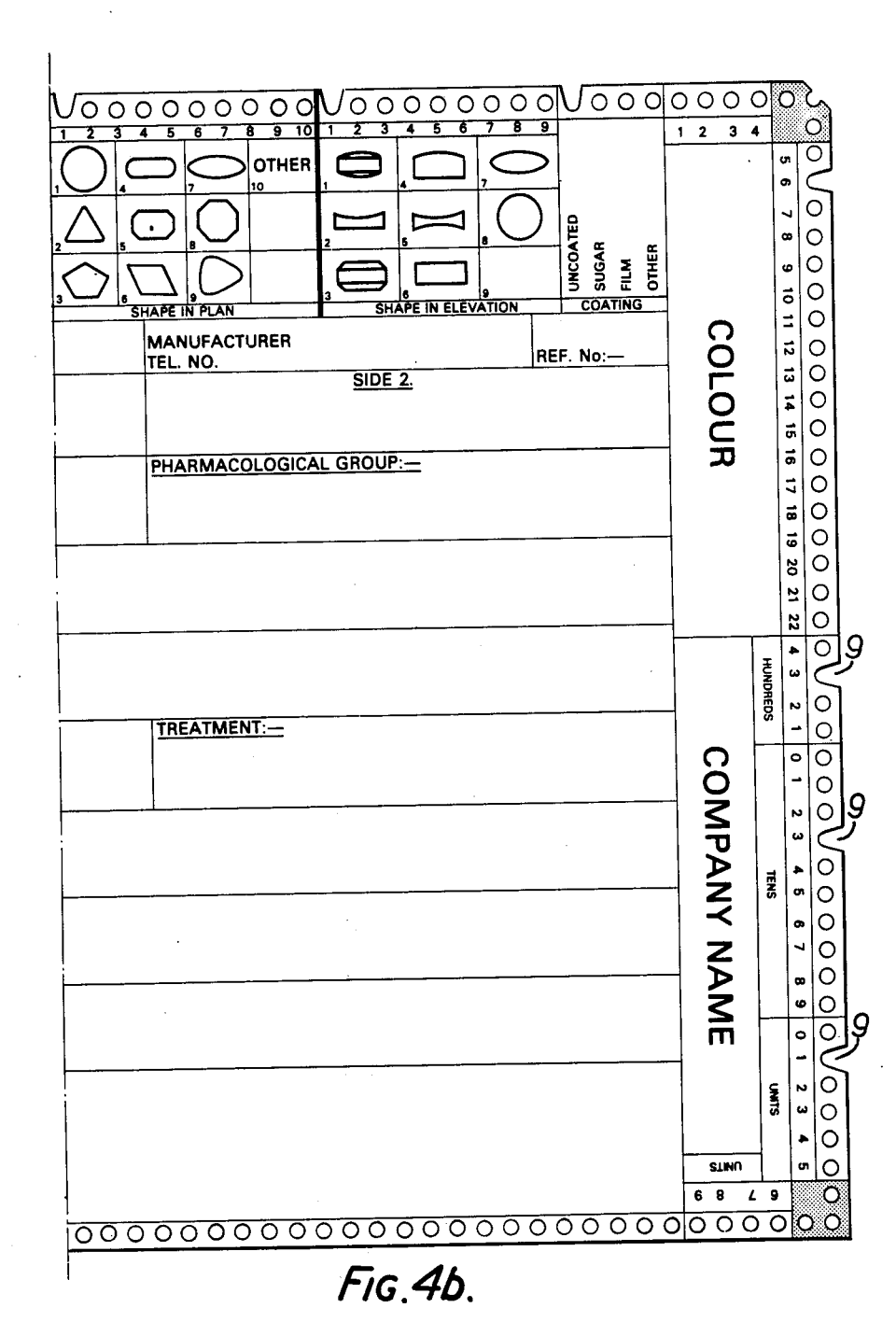

Referring now to FIGS. 1 to 3, there is shown a combined sizing and parameter-generating unit for use in the present identification system. The unit comprises a front plate 1 which is manufactured from good quality optically-clear plastics and is formed with two upstanding, parallel-sided ribs 2 which are directed towards each other at one end to define a V-shaped sizing channel 3. The unit also comprises a back plate 4 which is also manufactured of the same plastics as the front plate. At their edges, the plates 1 and 4 are formed with female and male snap-action fasteners 5 and 6 respectively so that they can be joined together and the front plate 1 is formed with locating pins 7 for passing through apertures in a stiff card 8 and locating it accurately in relation to the ribs. The card is visible through the front plate 1 and as shown in FIG. 1 bears a series of numbered graduation lines associated with the sizing channel 3, the apex angle of which is about 6°15'. It also bears on its front a series of edge-on views numbered 1 to 9 and a series of plan views numbered 1 to 9. As shown in FIG. 2, the back of the card 8 bears three series of colour samples numbered 1 to 18 and legends regarding markings on the dosage units according to whether they are tablets or capsules. A set of punched cards, of which one is shown in FIGS. 4a and 4b are maintained in a store, each bearing information regarding a particular dosage unit. Each card is formed with punched apertures around its edge and some of these are cut away as indicated at 9.

In order to illustrate the use of the present identification system, it will be assumed that a patient has been discovered in a collapsed state and that beside him there are some white scored tablets of the shape shown at A and B in FIG. 1. The ambulance man who discovers the patient then telephones or makes radio communication with the local area information pharmacist who is in charge of the punched card information storage and retrieval system. The pharmacist then puts the protocol into operation and first asks the ambulance man if he has a tablet or a capsule. The ambulance man replies that he has a tablet so the pharmacist inserts a selector pin into the stack of punched cards to remove to a separate location in the store all those cards relating to capsules, leaving only those relating to tablets.

In response to further questions from the pharmacist in accordance with the protocol, the ambulance man gives the colour number (the number corresponding to white on the back of the card), the edge-on or elevation shape number (1 in this case) and the plan-view number (also 1). The ambulance man is then instructed to place the tablet edge-on in the V as far down as it will go without force and to give the next number below the bottom edge of the tablet. As shown at A in FIG. 1, this edge-on V number is 14. Likewise the plan V number is given and is 30.

After each number corresponding to a parameter of the dosage unit has been given the pharmacist repeats the selection procedure until only one card is left which identifies the tablet. At this point markings on the tablet can be asked for to confirm the identification although there may be certain cases where these markings, e.g. scoring, have to be taken into consideration in arriving at the identification.

Experiments have shown that with the present system set up for 150 different dosage units a positive identification can be made after only five or six parameters have been given and in a very short time, which depends to some extent upon the skill of the pharmacist or other operator of the punched card system, even between dosage units which appear very similar to the untrained eye. It is believed that this is due primarily to the V-shaped sizing channel and it is surprising that with this channel it is possible to show up marked differences between dosage units which are apparently very similar.

It will be appreciated that many variations of the present identification system are possible and that apart from sizing in a V-shaped channel other parameters may be taken and in different orders. Furthermore, the apex angle of the V-shaped channel does not appear to be critical but should be such as to show up or amplify small differences between different dosage units. In this connection, it is to be noted that as it is the number next below the bottom of the dosage unit in the channel which is read, the channel can accommodate slight variations in thickness and diameter such as occur in the manufacture of dosage units. Likewise the colour samples are chosen to be representative of ranges of colours and an exact colour match is not required, only the best colour approximation being required. This will usually accommodate for any fading of colour due to exposure to light. In this connection, it is to be appreciated that the operator of the sizing unit should not be colour blind.

Finally, it will be appreciated that many variations of the information, storage and retrieval system may be made. If there is a very large number of cards then it may be desirable to store them in a plurality of storage units under a plurality of headings, e.g. "tablets—white or coloured", "capsules—hard or soft". Furthermore, as also indicated the information storage and retrieval system can be in the form of a computer with a keyboard. When the ambulance man or like reads out the parameter numbers, the computer operator can punch them out on the keyboard and feed appropriate information to the computer which will in known manner make the appropriate selection from its memory banks to produce a read-out or visual display of the information relevant to the dosage unit.

We claim:

1. An identification system for a solid dosage unit, comprising a member defining a substantially straight-sided channel which tapers from one end towards the other to define a V-shaped channel in which a dosage unit can be placed, markings being associated with the channel for indicating a dimension parameter of the unit when placed in the channel, a colour region having a plurality of coloured areas for indicating a colour parameter of the dosage unit, a shape region bearing a series of shape parameters, and an information storage and retrieval system operative, when fed with parameters of the dosage unit obtained from said V-shaped channel, from said colour region and from said shape region, to provide an identification of the unit.

2. The system of claim 1, wherein the member defining the V-shaped channel is a solid member one face of which is formed with a groove which is V-shaped in plan view.

3. The system of claim 1, wherein the member defining the V-shaped channel comprises two parallel sided walls mounted on a base so as to converge towards a point and to form a V-shaped channel.

4. The system of claim 1, wherein lines are marked across the V normal to the bisector of the angle of the V and are equidistant from each other.

5. The system of claim 4, wherein the apex angle of the V is about 6°15' and the lines have a spacing of 5 mm.

6. The system of claim 1, wherein said colour region and said shape region are provided in association with the member defining the V-shaped channel.

7. The system of claim 3, wherein said base comprises two plates between which are sandwiched at least one card bearing said colour region and said shape region.

8. The system of claim 1, wherein the information storage and retrieval system is a punched card system, and wherein the punched card system comprises a plurality of edge-punched cards stacked edge-on in a storage container, each card carrying details of one respective dosage unit and being punched with holes associated with a relevant parameter of the dosage unit, the punched card system also including at least one selector pin.

9. The system of claim 1, wherein the information storage and retrieval system is a computer with appropriate measuring units for each dosage unit and a selection mechanism programmable by punching into it appropriate parameter indications.

* * * * *